United States Patent
Fuchs et al.

(10) Patent No.: US 12,191,712 B2
(45) Date of Patent: Jan. 7, 2025

(54) METHOD FOR PRODUCING A COMPONENT PROVIDED WITH AT LEAST ONE STRUCTURAL ELEMENT, IN PARTICULAR WITH A FUNCTIONAL ELEMENT

(71) Applicant: Schlaeger Kunststofftechnik GmbH, Bayreuth (DE)

(72) Inventors: Anton Fuchs, Rückersdorf (DE); Christian Schuller, Bayreuth (DE); Marcus Gensel, Weidenberg (DE)

(73) Assignee: SCHLAEGER KUNSTSTOFFTECHNIK GMBH, Bayreuth (DE)

( * ) Notice: Subject to any disclaimer, the term of this patent is extended or adjusted under 35 U.S.C. 154(b) by 337 days.

(21) Appl. No.: 17/765,968

(22) PCT Filed: Oct. 2, 2020

(86) PCT No.: PCT/EP2020/077668
§ 371 (c)(1),
(2) Date: Apr. 1, 2022

(87) PCT Pub. No.: WO2021/064179
PCT Pub. Date: Apr. 8, 2021

(65) Prior Publication Data
US 2022/0393530 A1    Dec. 8, 2022

(30) Foreign Application Priority Data
Oct. 4, 2019    (DE) .......................... 102019126763.3

(51) Int. Cl.
*H02K 1/276*    (2022.01)
*B29C 45/14*    (2006.01)
*H02K 11/21*    (2016.01)
*H02K 11/25*    (2016.01)
*H02K 15/03*    (2006.01)

(52) U.S. Cl.
CPC ....... *H02K 1/276* (2013.01); *B29C 45/14639* (2013.01); *H02K 11/21* (2016.01); *H02K 11/25* (2016.01); *H02K 15/03* (2013.01)

(58) Field of Classification Search
CPC ........ H02K 11/25; H02K 11/21; H02K 15/03; H02K 1/27
USPC ................... 310/156.01, 156.53, 156.56
See application file for complete search history.

(56) References Cited

U.S. PATENT DOCUMENTS 4,674,178 A * 6/1987 Patel ...................... H02K 1/278
310/156.28
2005/0115059 A1    6/2005 Fuseya et al.
(Continued)

FOREIGN PATENT DOCUMENTS

DE    10322060    12/2004
DE    19754616    9/2007
(Continued)

OTHER PUBLICATIONS

PCT International Search Report (w/ English translation) and Written Opinion for corresponding Application No. PCT/EP2020/077668, mailed on Dec. 22, 2020—13 pages.

*Primary Examiner* — Jose A Gonzalez Quinones
(74) *Attorney, Agent, or Firm* — Dority & Manning, P.A.

(57) ABSTRACT

A method for producing a component provided with at least one structural element, in particular a component for an electrical machine, wherein the structural element(s) is fixed in a recess of a carrier body by a fixing material introduced in an injection moulding process, wherein the following method steps are provided: providing a carrier body provided with at least one recess, arranging the structural element(s) at least partially, in particular completely, within a first recess portion arranged in the recess of the carrier body, arranging at least one filler means in a second recess portion of the recess of the carrier body, injecting a fixing
(Continued)

material, in particular consisting of plastic, into the first recess portion of the recess of the carrier body in the course of an injection moulding process, wherein the fixing material fixes the at least one structural element(s) within the recess.

20 Claims, 4 Drawing Sheets

(56) References Cited

U.S. PATENT DOCUMENTS

| | | |
|---|---|---|
| 2012/0062054 A1 | 3/2012 | Bradfield |
| 2013/0334910 A1 | 12/2013 | Takahashi et al. |
| 2014/0132094 A1* | 5/2014 | Chamberlin ......... H02K 1/2766 29/598 |
| 2019/0315027 A1* | 10/2019 | Sugiyama ............... B29C 45/14 |

FOREIGN PATENT DOCUMENTS

| | | |
|---|---|---|
| DE | 202011050715 | 11/2011 |
| DE | 102011121412 | 6/2013 |
| DE | 102012016927 | 2/2014 |
| DE | 102015201493 | 8/2016 |
| DE | 102015218924 | 3/2017 |
| EP | 0538472 | 4/1993 |
| EP | 3468005 | 4/2019 |
| JP | 2017163761 A * | 9/2017 |
| JP | 2018074868 | 5/2018 |
| JP | 2018166405 A * | 10/2018 |
| WO | WO2012124072 | 9/2012 |

* cited by examiner

METHOD FOR PRODUCING A COMPONENT PROVIDED WITH AT LEAST ONE STRUCTURAL ELEMENT, IN PARTICULAR WITH A FUNCTIONAL ELEMENT

This application is a National Phase Application of International Application No. PCT/EP2020/077668, filed Oct. 2, 2020, which, in turn, claims the right of priority of German Patent Application No. DE102019126763.3, filed on Oct. 4, 2019, both of which are hereby incorporated herein by reference in their entirety for all purposes.

The invention relates to a method for producing a component provided with at least one structural element, in particular with a functional element.

Corresponding methods for producing a component provided with at least one structural element, in particular with a functional element, are known in principle from the prior art.

The object of the invention is to describe a method for producing a component provided with at least one structural element, which method increases the quality and dimensional accuracy of the components to be produced, in particular with regard to a simple and fast as well as cost-effective measure.

The object is achieved by a method for producing a component provided with at least one structural element according to claim 1. The claims dependent thereon relate to possible embodiments of the method.

The invention relates to a method for producing a component provided with at least one structural element, in particular a functional element, in particular a component for an electrical machine, wherein the at least one structural element is fixed in a recess of a carrier body by a fixing material introduced in an injection moulding process. The method is characterised by the following method steps: (a) providing a carrier body provided with at least one recess, (b) arranging the at least one structural element at least partially, in particular completely, within a first recess portion arranged in the recess of the carrier body, (c) arranging at least one filler means in a second recess portion of the recess of the carrier body, (d) injecting a fixing material, in particular consisting of plastic, into the first recess portion of the recess of the carrier body in the course of an injection moulding process, wherein the fixing material fixes the at least one structural element within the recess. The component provided with at least one structural element can be used, for example, as a rotor and/or as a stator of an electrical machine or can form part of a rotor and/or stator.

It is possible that at least one structural element is used which is formed as a functional element performing at least one function; here, the structural element can perform a chemically and/or physically effective function. For example, the structural element may have, at least in sections, a visually and/or haptically perceptible function at least in the state installed in the component. Alternatively or additionally, the structural element may perform, at least in sections, an (a) electrically conductive or electrically insulating function and/or (b) a thermally conductive and/or thermally insulating function. For example, the structural element can optionally perform a magnetic function, and so the structural element can, for example, be provided with a magnetic material at least in sections and thus can form a magnetic element.

Alternatively or additionally, the structural element can be used for example as a sensor, for example as a sensor that functions according to a mechanical and/or a thermoelectric (e.g. thermocouple, NTC, PTC) and/or a resistive (e.g. strain gauge, heat wire) and/or a piezoelectric (acceleration sensor) and/or a capacitive (e.g. pressure sensor) and/or an inductive (e.g. inclination sensor) and/or an optical (e.g. CCD sensor also referred to as a "charge-coupled device" sensor) and/or an acoustic (e.g. double sheet control) and/or a magnetic (e.g. Hall sensor, reed contact) operating principle. In particular, the structural element as a temperature sensor can be formed as an actuator and/or as a heat dissipation means. For example, the structural element is formed at least partially as a hot conductor (NTC resistor) or a cold conductor (PTC resistor), in particular a structural element formed in this way can be used for electrical temperature measurement and/or for limiting the starting current of electrical devices.

The at least one structural element can, for example, be formed as a rigid body, in particular the structural element can have a higher rigidity than the at least one, in particular all filler means and/or than the carrier body and/or than the fixing material present in the finished component. Thus, the structural element can be present as an element with a completely determined shape or geometry, which is placed in a defined position and/or with a determined force in the recess prior to the introduction of the fixing material.

The structural element can, for example, be provided, in particular encased, with a plastic, at least partially, by a preceding injection moulding process. Alternatively or additionally, the structural element can comprise an assembly and this assembly can be placed at least partially in the recess before the fixing material is introduced.

The at least one structural element of the component formed as a magnetic element can be a permanent magnet. Preferably, all structural elements of the component formed as magnetic elements are formed as permanent magnets. In principle, however, it is also conceivable that the structural element or the at least one structural element formed as a magnetic element is formed as an electromagnet.

The carrier body can be formed at least partially, in particular completely, of plastic and/or of metal. Alternatively or additionally, the carrier body can be formed at least partially, in particular completely, of a ceramic.

Regardless of the embodiment of the carrier body made of plastic and/or of metal and/or of a ceramic, the carrier body typically has at least one recess into which at least one structural element can be introduced or is introduced. The at least one structural element is fixed by a fixing material introduced into the recess by way of an injection moulding process. The structural element is therefore fixed in the recess typically by being overmoulded with a fixing material at least partially, possibly completely.

In a first method step, a carrier body provided with at least one recess, in particular with a plurality of recesses, for example more than ten, is provided. In this case, the carrier body can be introduced, i.e. in particular inserted or placed, into the injection mould manually and/or in automated fashion, at least partially. The carrier body can be introduced into the injection mould manually or by means of a handling system, e.g. a robotic handling system, at least in partially automated fashion, possibly fully automated fashion.

Subsequently, the at least one structural element is arranged and the at least one filler means material is arranged in at least one recess of the carrier body. The arrangement of the at least one structural element and the at least one filler means material can take place simultaneously or in any sequence or order. The arrangement of the structural element and/or the at least one filler means material can also take place before or after or at the same time as the arrangement of the carrier body in an injection mould.

Preferably, the carrier body can be equipped with at least one filler means material in a first step. In particular, at least one filler means material can be inserted or introduced into a plurality of recesses or into each recess to be provided with at least one structural element. The introduction of the at least one structural element and the placement in or on an injection mould can take place chronologically subsequently.

For example, the at least one filler means material may be arranged or formed in such a way as to contact the at least one structural element during the injection of the fixing material and/or in the finished or final state of the component. Supporting the structural element by the filler means may be advantageous for the injection process of the fixing material in order to secure the position and/or orientation of the structural element. Support of the structural element by the filler means may be provided, for example, in such a way that at least one region of a filler means extends only over a part of the total length of a recess and this region serves as a contact region or as an abutment region for the structural element. Alternatively or additionally, it can be provided, for example, that at least one filler means is arranged or formed in such a way that it does not contact the at least one structural element arranged in the same recess as the filler means during the injection of the fixing material and/or in the finished or final state of the component. Thus, the free space or the distance between the filler means and the structural element can be filled by the fixing material at least partially. Lastly, it may be provided that none of the filler means arranged or formed within at least one recess of a carrier body contact or touch any structural elements also arranged in this recess (no mechanical contact). In other words, it may be provided that, prior to the introduction or injection of the fixing material, the at least one structural element is spaced from the filler means to form a spacer volume. At least part of the fixing material can be injected into this spacer volume and can cure. Thus, in the finished state of the component—provided that the fixing material remains at least partially in the component—the structural element is indirectly connected to the filler means via the cured fixing material located in the spacer volume. For example, the filler means is not touched or contacted by the structural element at least immediately before or during the introduction or injection of the fixing material.

The recess has at least two recess portions. A first recess portion may serve to receive the structural element and to receive the fixing material. At least one further recess portion (hereinafter: second recess portion), arranged or formed in addition to the first recess portion within the at least one recess of the carrier body, constitutes a receiving space for the filler means. Here, the first recess portion typically does not form part of the second recess portion, and vice versa. Rather, the second recess portion has a geometric shape that differs from the geometry of the first recess portion, in particular due to the boundary surfaces of the carrier body forming the recess that define it. For example, the first and second recess portions can be spatially delimited from each other at least by a constricted region or by a narrow point within the recess, or the first and second recess portions can be spatially delimited from each other by a constricted region or by a narrow point within the recess. This means, for example, that the second recess portion comprises an increase in volume or an increasing volume region compared to at least the transition region to the first recess portion.

If the filler means and the structural element are arranged in the recess, the first recess portion has a free space or receiving volume for a fixing material, wherein this free space or this receiving volume may be immediately adjacent to the second recess portion and to the structural element of the first recess portion. During the injection of the fixing material or as a result of the injection of the fixing material into the free space of the first recess portion of the recess of the carrier body in the course of an injection moulding process, the structural element is fixed within the recess. As a result of the fact that during the injection of the fixing material at least one filler means is present in the recess, more precisely in the second recess portion of the recess, the cavity or the free volume available for filling by the fixing material or the space of the recess or of the first recess portion available for receiving the fixing material is (significantly) reduced. With this reduction of the space of the recess available for receiving the fixing material, in particular an adjustment of the injection moulding process and thus the injection or introduction of the fixing material can be simplified and/or carried out in a more defined and thus more reproducible manner.

The first and/or second recess portions may present in the form of a plurality of recess portions separated from each other by the other recess portion within a recess of the carrier body. For example, it is possible for the recess to have two second recess portions separated from each other by a first recess portion, each for receiving a filler means.

For example, a recess can have "demanding" geometric regions in terms of injection moulding, especially with regard to the flow paths or mould filling, which regions are caused in particular by irregular geometries and/or jumps in cross section. Such regions are usually difficult to fill in the injection moulding process or pose difficulties for a defined and reliable filling with fixing material. Especially if not only a recess is to be filled with an injection moulding material, but this injection moulding material—as in the present case—also serves or is intended to serve for fixing a structural element accommodated within the recess, a disturbing influence in obtaining a desired introduction and/or flow and/or curing behaviour of the injection moulding material or of the fixing material is undesirable due to the irregular geometries and/or cross-sectional changes in some regions within the recess. Preferably, in particular such problem regions or the disturbing influence can be handled or even eliminated by isolating or separating them from the space of the recess provided for the introduction of the fixing material by means of the filler means. In other words, the use of a filler means can make it possible to equalise the jumps in volume and/or cross-section and/or filling pressure within the recess of the carrier body for the introduction or injection of the fixing material. The geometrically problematic regions are defined, for example, as second recess portions of the recess and are provided with a filler means at least partially before the injection of the fixing material, in such a way that these geometrically problematic regions cannot not be filled with the fixing material to be injected for fixing the structural element.

This means that, despite the presence of geometries within the recess that are problematic for the injection moulding process, such geometries can be provided in the carrier body and thus in the component and at the same time the at least one structural element can be fixed reliably and reproducibly in the course of an injection moulding process.

It is possible that the fixing material comes into mechanical contact with the at least one structural element and the at least one filler means at least during the injection of the fixing material into the recess of the carrier body. Due to the (mechanical) contact of the filler means with the structural element and thus due to an indirect connection of the at least one structural element via the filler means with boundary surfaces defining the recess of the carrier body, the structural element can be fixed within the recess of the carrier body in an integrally bonded and/or form-fitting manner. The fact that the fixing material, during its injection into the recess, comes at least temporarily into (mechanical) contact with the filler means ensures that the fixing material is steered within the recess and/or that movement of the fixing material into defined recess regions (e.g. problematic geometries) is prevented. Due to this steering function or movement prevention function of the filler means, the injection moulding process for introducing the fixing material for fixing the structural element within the recess of the carrier body can be carried out reliably.

The filler means can, for example, extend at least during the injection of the fixing material over at least one extension length, in particular over the length or maximum extension length, of at least one structural element. Thus, for example, the filler means can extend from a first end face of the structural element to its opposite end face, in particular without gaps, or rather continuously. It can also be provided that the filler means extends, in particular continuously, or rather uninterruptedly, over the height of the recess, i.e. from an underside to an upper side of the recess or of the carrier body.

For example, the at least one structural element can be arranged within the at least one recess of the carrier body in such a way that the at least one structural element is completely received in the recess. In other words, the structural element may be received and fixed in the recess of the carrier body such that the structural element does not protrude beyond a main extension volume of the carrier body or a volume of the carrier body limited by the outer contour. For example, the structural element is in the recess in such a way that the structural element bears flush against at least one boundary edge or surface of the main extension volume of the carrier body or terminates flush therewith. For example, it can be provided that the structural element is arranged without a gap or supporting itself in relation to a plane bounding the carrier body and is overmoulded or fixed at least partially by the fixing material. Thus, the surface of the structural element forming the support is exposed or provided without a fixing material after the fixing by the fixing material to the component.

Alternatively or additionally, it may be provided that the fixing material and/or the fixing means is/are accommodated and/or arranged and/or fixed in the recess of the carrier body in such a way that the fixing material and/or the fixing means does/do not protrude beyond a main extension volume of the carrier body or a volume of the carrier body limited by the outer contour. For example, it may be provided that an upper side and/or an underside of the carrier body of the finished component is not protruded beyond by a fixing material and/or by a filler means, i.e. for example that the fixing material and/or the filler means form a flush termination with the upper side and/or underside of the carrier body.

For example, the injection of the fixing material into the recess may be performed in at least two steps, wherein in a first step a first partial amount of the fixing material is injected into the recess and in at least one further step a further partial amount of the fixing material is injected into the recess. Alternatively, the fixing material may be injected in a single injection step for fixing at least one structural element within a recess.

In a preferred embodiment, it may be provided, for example, that the fixing material comes into (mechanical) contact with the at least one structural element and the at least one filler means, or the fixing material contacts or acts upon the at least one structural element and the at least one filler means, at least during the injection of the fixing material into the first recess portion of the recess of the carrier body.

It is possible that a filler means is used which is formed at least partially, in particular completely, from a thermoplastic and/or a thermoset and/or which is formed at least partially, in particular completely, from a metal, in particular a castable, in particular injection-mouldable, metal. The filler means has sufficient dimensional stability so that when the filler means is acted upon by the fixing material injected into the recess in the course of the injection moulding process, the filler means does not undergo any (significant) deformation. Due to the dimensional stability of the filler means, it can perform its steering and/or guiding function for the targeted influencing of the movement of the injected fixing material within the recess of the carrier body. In particular, a sufficiently dimensionally stable filler means can reliably prevent movement of the injected fixing material into volume regions filled by the filler means.

It can optionally be provided that the filler means remains at least partially, in particular completely, in the recess after the injection of the fixing material, preferably the filler means forms at least partially, in particular completely, a part of the component provided with at least one structural element. Here, the filler means can perform a dual function; on the one hand, it can serve to limit or guide the fixing material introduced or injected into the recess, and on the other hand, as a part of the component, it can represent or obtain chemical and/or physical functions and/or properties of the component. Thus, the filler means remaining on the component can perform a stability function and/or a function influencing a magnetic field. The filler means can also perform a corresponding function within the component with regard to its thermal behaviour, in particular thermal conductivity. The material and/or the geometry of the filler means, possibly the formation of cavities within the filler means, can be selected or designed accordingly.

Preferably, the same or a similar material as for the fixing material is used as the material of the filler means at least partially, in particular completely. In this way, it can be achieved that in the finished component, the transitions between the filler means and the fixing material are uniform in terms of material and, for example, have a similar or equivalent or identical way of physically and/or chemically influencing the component. In particular, a similar or identical influence or non-influence of a magnetic field acting there and/or of heat currents acting there can result at the transitions and/or for the filler means and the fixing material. The similarity or use of an identical material for the filler means and the fixing material can also ensure that no additional imbalances occur in a component that rotates in the intended use, in particular a component used as a rotor.

Alternatively or additionally, after the fixing material has been injected into the recess, in particular after the fixing material has cured, the filler means can be extracted or driven out of the recess at least partially, in particular completely, or can be removed (e.g. by falling out by gravity). The filler means can also be formed as a core to be removed after the forming or curing of the fixing material. For this purpose, the filler means can be changed in its aggregate state by means of a solvent, for example, and removed from the recess.

Alternatively or additionally, the filler means can be designed as a temporary placeholder, which is inserted into the recess before the fixing material is injected (working position) and is moved out of the recess at least partially, in particular completely, after the fixing material has been injected, preferably after the fixing material has cured. Thus, the filler means can be at least partially, in particular completely, not contained in the finished component. Insofar as the filler means is removed from the recess after the injection and/or curing of the injected fixing material, it can be provided that the filler means is used or can be used in a subsequent injection process of a fixing material in a further recess of the same or a further carrier body.

In a further advantageous embodiment, it may be provided that a first and at least one further filler means are arranged within a recess prior to injection of the fixing material. In this case, the fixing material can contact or act on the structural element and the first and the at least one further filler means during at least its injection or during the injection moulding process. Thus, both the first and the at least one further filler means act on the fixing material introduced into the recess to influence the flow path or the flow direction.

It is also possible that the carrier body has at least two, in particular more than ten, recesses, in each of which at least one structural element (in particular a plurality of structural elements) is/are arranged. Preferably, in a first step, a group of structural elements, in particular all structural elements of a component, can be arranged in the recesses and, in a subsequent step, the fixing material for fixing the group of structural elements, in particular all structural elements of a component, can be injected inside the recesses. Thus, an efficient component for an electrical machine, in particular a rotor or stator component, can be formed. Also, the grouping of the handling or the assembly and fixation of a plurality of structural elements enables a simplified and economical production process.

If a plurality of structural elements are provided in a common recess or in separate recesses of a carrier body, it can be provided, for example, that the longitudinal extension axes of at least two, in particular all, structural elements are oriented parallel to each other. This equivalent or similar orientation of the structural elements facilitates the introduction of the fixing material.

It is possible that a first group of structural elements, in particular at least partially arranged in different recesses, are fixed in a first step by injecting a fixing material and in a subsequent step a second group of structural elements, in particular at least arranged in different recesses, are fixed by injecting a fixing material. Preferably, the structural elements of the first group are arranged in a first group of recesses of the carrier body and the structural elements of the second group of structural elements are arranged in a second group of recesses of the same carrier body, which is different from the first group of recesses. It may be provided here that, depending on the geometry of the structural elements and/or the geometry of the recesses for receiving these structural elements, groups are formed which, at least partially, in particular completely, are provided with fixing material simultaneously or fixing material is injected simultaneously in a common injection moulding process (injection moulding process step). Alternatively or additionally, it can be provided that identical or different fixing material is used for fixing the various groups of structural elements in the respective recesses of the carrier body.

In a preferred embodiment, it can be provided that the structural element is arranged within the at least one recess of the carrier body in such a way that the structural element is at a distance from at least one boundary surface of the carrier body defining the recess, in particular the structural element is arranged or formed in such a way that it is at a distance from all boundary surfaces of the carrier body defining the recess, thus defining a spacing volume. The spacing or the gap between the structural element and a boundary surface of the recess of the carrier body can be formed in such a way that it has a uniform shape, in particular the gap dimension or the spacing is uniform, e.g. constant, over at least a portion of an overall gap. Alternatively or additionally, the spacing can be formed, for example, as an annular gap or as a spacing volume enclosing the structural element without gaps. The intermediate space, in particular annular gap, can serve as a receiving space for at least partial, in particular complete, receiving of the fixing material injected into the recess.

In a preferred embodiment, the injected fixing material completely surrounds the at least one structural element, at least on its outer surface. It may also be provided that the fixing material completely encloses the structural element, so that the structural element is completely surrounded by the fixing material. The complete enclosure can comprise, for example, openings for retaining and/or fixing material and/or apertures or openings for connection means which are connected to the structural element, in particular electrically, and which serve to fix the position and/or orientation of the structural element during the overmoulding of the structural element or can transmit a signal, in particular an electrical signal, for example a measurement and/or control signal, to and/or from the structural element. The at least one structural element can, for example, be arranged in the recess in such a way that the spacer volume surrounds the structural element in the form of a sheath or jacket at least partially, in particular the spacer volume surrounds all the surfaces of the structural element facing the boundary surfaces of the recess of the carrier body receiving the structural element.

The spacer volume, in particular the first recess portion of the recess, can for example be filled with fixing material at least partially, in particular completely, during the injection of the fixing material. Thus, the first recess portion, in addition to the structural element, is completely filled with the fixing material.

It is also possible for the at least one structural element to have at least one surface facing a boundary surface of the recess, in particular a corresponding and/or parallel surface, wherein the structural element is arranged in the recess in such a way that the distance between the surface and the boundary surface of the recess facing the surface is constant at least partially, preferably predominantly, particularly preferably completely. The surface of a structural element formed, for example, as a magnetic element can serve to influence a magnetic field generated during the intended use of the component. In an exemplary embodiment, one surface of a structural element is flat, wherein the reference surface or boundary surface of the recess corresponding to this surface can also be flat; in particular the two flat surfaces are oriented parallel to each other.

A structural element can, for example, be cube-like or cuboidal in shape. Preferably, the first recess portions for receiving the at least one cube-like or cuboidal structural element are formed in a corresponding manner, i.e., for example, as at least substantially cuboidal, in particular as cuboidal, cavities. A surface of the inserted structural element and/or a boundary surface or recess associated with the surface of the inserted structural element, in particular of the first recess portion, can be rectangular, preferably square, at least partially, in particular completely.

The at least one second recess portion can be designed in such a way that the structural element to be installed cannot be introduced into the second recess portion. This means, for example, that the structural element is not introducible into the second recess portion due to its shape. Thus, the second recess portion and/or the filler means filling the second recess portion may have a non-cuboidal or non-cube-like shape or geometry.

In an advantageous further embodiment, it can be provided, for example, that the at least one structural element has a first and a second surface and is arranged in the recess in such a way that the first surface is assigned to a first boundary surface of the recess, in particular oriented parallel to the first surface, and the second surface is assigned to a second boundary surface of the recess, in particular oriented parallel to the second surface, wherein the first surface is at a first distance from the first boundary surface and the second surface is at a second distance from the second boundary surface, and in particular the first distance corresponds to 0.25 to 4 times, preferably 0.5 to 2 times, particularly preferably 0.75 to 1.34 times the second distance. The first and second distances can be identical, for example. At least one distance, preferably at least the first and second distance, may or may not be constant, i.e., for example, the contour shape of the surface may correspond or at least approximately correspond to the contour shape of the boundary surface of the recess of the carrier body assigned thereto. By way of example, the distance may be in the range of 0.05 to 1.00 mm, preferably in the range of 0.10 to 0.50 mm, particularly preferably in the range of 0.20 to 0.35 mm. An analogous spacing ratio may alternatively or additionally be applied to the spacing between the structural element and at least two filler means adjacent to the structural element. This means, for example, that the first distance of a first surface of the structural element from a first filler means and the second distance of a second surface of the structural element from a further filler means can be in the range from 0.05 to 1.00 mm, preferably in the range from 0.10 to 0.50 mm, particularly preferably in the range from 0.20 to 0.35 mm.

In a preferred embodiment, a plastic can be used as the fixing material. Preferably, an injection-mouldable plastic is used as the fixing material. Particularly preferably, a thermoplastic is used as the fixing material, particularly preferably a polyester, in particular a polyethylene terephthalate (PET), and/or a polyamide, in particular a tetramethylene diamine (PA4.6) or nylon (PA6.6), and/or a polyphthalamide (PPA) and/or a polypropylene (PP) and/or polyphenylene sulphide (PPS) and/or a polyetheretherketone (PEEK) and/or a liquid crystalline polymer (LCP) LCP is used as fixing material. Alternatively or additionally, the fixing material may have a conductivity of at least 0.20 W/mK, preferably at least 0.30 W/mK, particularly preferably 0.80 W/mK, most preferably 1.80 W/mK. For example, the fixing material may consist of PA 6.6 GF 35 and/or PA4.6 GF 35 and/or PA 4.6-GF 20 and/or PAA and/or PP M40 and/or PEEK CF 30 and/or PPS GF25 and/or PA46 GF20 and/or PPS GF33 with, for example, a thermal conductivity of 0.3 W/mK and/or PPS GF25, for example with a thermal conductivity of 1.0 W/mK, and/or PS46 GF20, for example with a thermal conductivity of 2.1 W/mK for example.

The carrier body can, for example, be compressed before the fixing material is injected, in particular before the at least one structural element is arranged in the recess of the carrier body, preferably the fixing material is injected into the recess, in particular into the first recess portion, in the compressed state of the carrier body. In this case, the carrier body can, for example, be acted upon or compressed with a defined preload (pretension) (i.e., for example, a preload generated in a defined manner) of from 1 to 50 kN, preferably from 2 to 35 kN.

It is possible that at least one filler means and/or at least one fixing material is used which has a stiffness which corresponds to the stiffness of the carrier body by a factor of 0.5 to 1.5, preferably by a factor of 0.7 to 1.3, particularly preferably by a factor of 0.85 to 1.15, most preferably by a factor of 0.95 to 1.05. In particular, if compression of the carrier body during the process is envisaged, it may be advantageous if the stiffness or spring behaviour (a) of the carrier body and the filler means and/or (b) of the carrier body and the fixing material is at least similar or identical. The at least similar or identical stiffness or spring behaviour of the carrier body and at least one, in particular all filler means and/or fixing materials results in no or no substantial relative movement between the carrier body and the filler means after decompression of the carrier body. Such a relative movement could be disadvantageous in that, for example, a fixing material injected between the carrier body and the filler means experiences stresses which could possibly lead to cracks in the filler means. Decompression can take place, for example, during or after introduction of the fixing material in the course of an injection moulding process. For example, this can be used to prevent pretensioning of the filler means within the finished component. Alternatively or additionally, it may be provided that the fixing material has a similar or equivalent or identical stiffness or spring behaviour as the carrier body and/or the filler means. This allows the fixing material and/or the filler means material to have a similar or identical recovery behaviour or a similar recovery movement during decompression and expansion of the compressed carrier body.

In an optional embodiment, it is provided that the carrier body is compressed together with at least one filler means arranged in a recess of the carrier body, in particular before or during an introduction of a fixing material into the recess, wherein the carrier body and the at least one filler means have (in comparison with each other) a similar or identical stiffness and/or spring behaviour. For example, at least one filler means, in particular all filler means, is/are arranged in the recess and/or in the recesses before the carrier body is compressed and is/are then compressed together with the carrier body at least partially, in particular completely, in a compression step. As a result of the fact that the filler means and the carrier body have a similar or identical stiffness or spring behaviour, a pretension in the filler means is effectively prevented, since, during decompression and expansion of the compressed carrier body and the compressed filler means, both have a similar or identical recovery behaviour or perform a similar or identical recovery movement.

It is possible that a carrier body is used which is constructed in multiple parts; preferably the carrier body is formed from at least two, in particular more than ten, disc-like or disc-shaped carrier body plates, particularly preferably at least two, in particular more than ten, carrier body plates are assembled before the fixing material is injected into the at least one recess. The carrier body plates can be assembled in stacks to form a stacked pack before the fixing material is injected. The individual carrier body plates of the carrier body may be of a similar and/or identical design. The carrier plate bodies can, for example, be produced from a metal sheet, in particular punched out, by a cutting process, in particular a shearing cutting process.

In a preferred embodiment, it may be provided that for injecting the fixing material into the at least one recess of the carrier body, a sprue distributor is applied to the carrier body and has at least two sprue locations or sprue outlets for introducing the fixing material into a recess, in particular the fixing material is injected into each recess of the carrier body provided with a structural element which has at least two sprue locations or sprue outlets for each recess.

In addition to the device for producing a component provided with at least one structural element, the invention also relates to a device for carrying out a method for producing a component described herein and provided with at least one structural element. The device may, for example, comprise a holding portion for temporarily holding the carrier body. The device may also comprise means (e.g. sprue distributors) which enable an at least temporary introduction of a filler means into a recess of the carrier body, in particular in an automated manner.

In addition to the device and the method, the invention also relates to a component, in particular a component for an electrical machine, which has been produced using a method described herein. The component may be characterised, for example, by the fact that in the finished state of the component the filler means remaining in the component and the fixing material are in contact with one another. The fixing material can also be moulded onto the filler means remaining in the recess and/or can form an at least integrally bonded connection.

All advantages, details, embodiments and/or features of the method according to the invention are transferable or applicable to the device according to the invention and the component according to the invention.

The invention is explained in more detail on the basis of exemplary embodiments in the drawings, in which.

Figure 1:
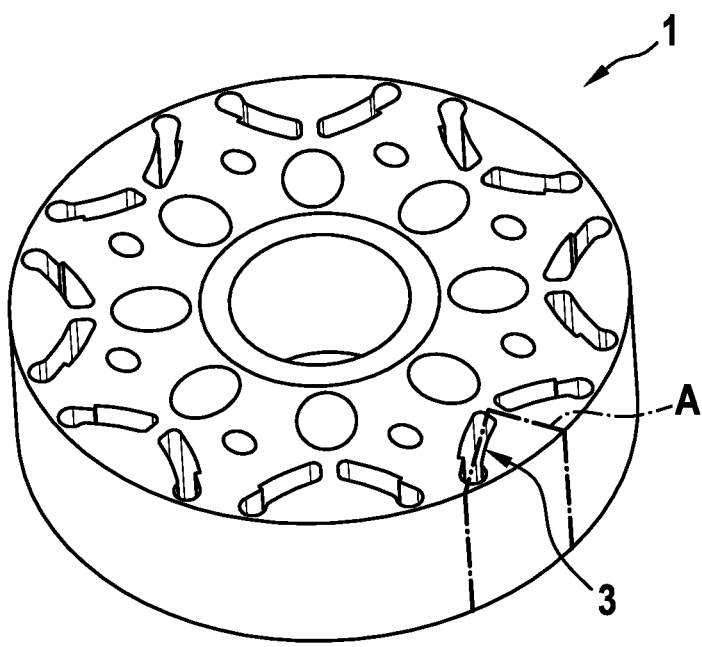
FIG. 1 shows a perspective schematic diagram of a component formed as a stator of an electrical machine according to an exemplary embodiment.

FIG. 1 shows a component 1 in the form of a rotor which has multiple structural elements 2, for example more than ten structural elements 2. The structural elements 2 are accommodated in recesses 3 of the carrier body 4. By way of example, a single recess 3 will be considered hereinafter. A structural element 2 is accommodated in the recess 3 of the carrier body 4 and is fixed by a fixing material 5 introduced in an injection moulding process, see FIG. 2. The method for producing the component 1 has the following method steps: (a) providing a carrier body 4 provided with at least one recess 3, (b) arranging the at least one structural element 2 at least partially, in particular completely, within a first recess portion 6 arranged in the recess 3 of the carrier body 4, (c) arranging at least one filler means 7 in a second recess portion 8 of the recess 3 of the carrier body 4, (d) injecting a fixing material 5, in particular consisting of plastic, into the first recess portion 6 of the recess 3 of the carrier body 4 in the course of an injection moulding process, wherein the fixing material 5 fixes the at least one structural element 2 within the recess 3 or within the first recess portion 6.

Figure 2:
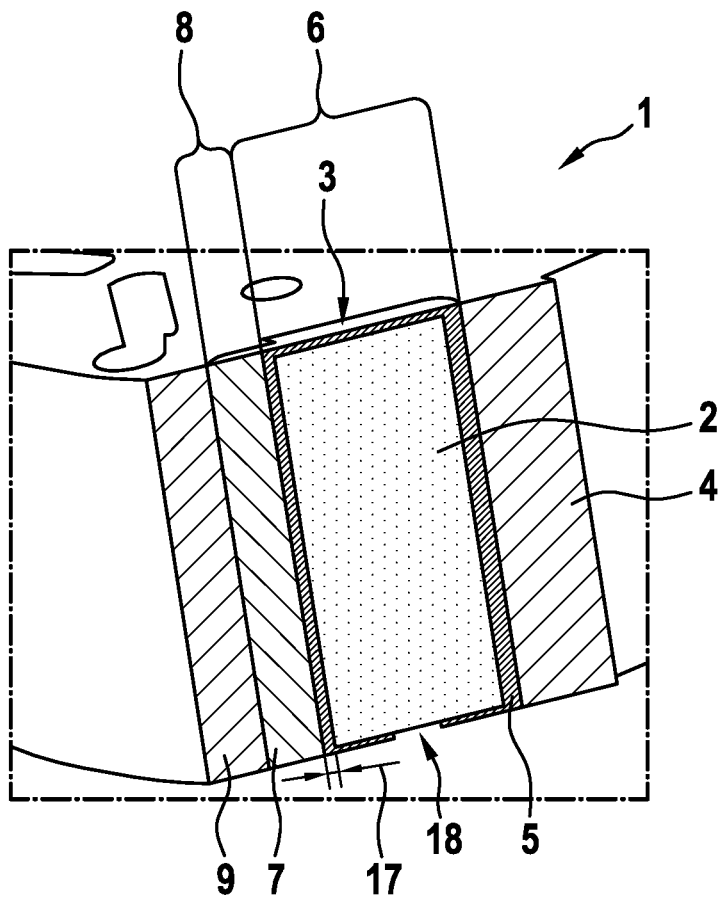
FIG. 2 shows a schematic detail depiction according to detail A from FIG. 1.

As can be seen in FIG. 2, the fixing material 5 comes into mechanical contact with the at least one structural element 2 and the at least one filler means 7 at least during the injection of the fixing material 5 into the recess 3 of the carrier body 4. Due to the fact that the fixing material 5 contacts or acts on the filler means 7 while the fixing material 5 is injected into the recess 3, the fixing material 5 can be guided and/or managed. In particular, geometric regions 9 of the recess 3 that are problematic for an injection moulding process can be equipped or provided with at least one filler means 7 in order to render such regions ineffective for the injection moulding process in which the fixing material 5 is injected or to eliminate such regions. The problematic geometric regions 9 of a recess are thus defined at least partially, in particular completely, as second recess portions 8 and are equipped or provided with at least one filler means 7 before the fixing material 5 is introduced.

The at least one filler means 7 can be formed at least partially, in particular completely, from a thermoplastic and/or a thermoset and/or at least partially, in particular completely, from a metal. The filler means 7 is introduced at least partially, in particular completely, into the recess 3 or into the at least one second recess portion 8, 8' of the recess 3 in the course of an arrangement step chronologically preceding the injection moulding step in which the fixing material 5 is introduced.

The filler means 7 can remain in the recess 3 at least partially, in particular completely, after the injection of the fixing material 5, and in particular the filler means 7 forms at least partially, in particular completely, a part of the component 1 provided with at least one structural element 2. Alternatively or additionally, the filler means 7 can be removed from the recess 3 at least partially, in particular completely, after the fixing material 5 has been injected, in particular after the fixing material 5 has cured. In the embodiment shown in FIG. 1, the filler means 7 introduced into the recess 3 remains completely in and/or on the component 1.

According to the embodiments shown in FIGS. 3 to 6, a first and at least one further filler means 7, 7' can be arranged inside a recess 3 before the fixing material 5 is injected. These two filler means 7, 7' can be provided in the region of geometric courses (geometric regions 9) of the recess 3 which are problematic for the injection moulding process. The filler means 7, 7' are introduced into the second recess portions 8, 8', so that these recess portions 8, 8' cannot be filled with fixing material 5, since their volume is separated or sealed off by the filler means from the introduction space of the fixing material 5, i.e. the first recess portion 6. In other words, the sprues for introducing the fixing material are arranged in the first recess portions 6, so that the fixing material 5 is distributed or introduced into the recess 3 starting from these first recess portions 6. During the injection of the fixing material 5, the structural element 2 and the first filler means 7 and the at least one further filler means 7' are contacted or acted upon by the injected fixing material 5.

Thus, the filler means 7, 7' as well as the structural element 2 can have a form-giving or form-influencing effect on the introduced fixing material 5.

Figure 5:
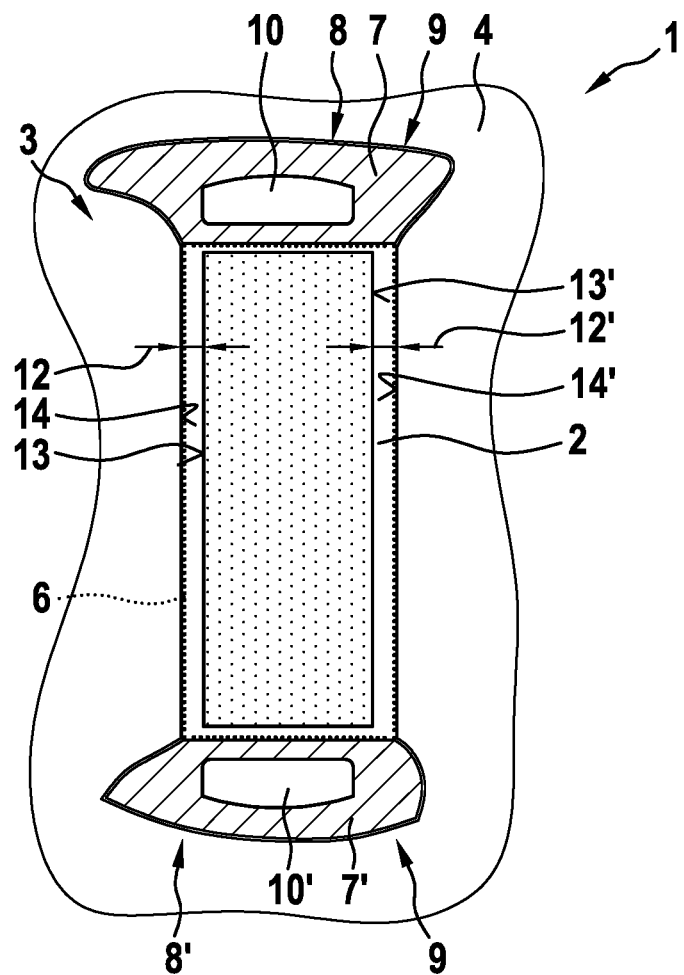
FIG. 5 shows a schematic plan view of a recess arranged in a carrier body in accordance with an exemplary embodiment.
Figure 6:
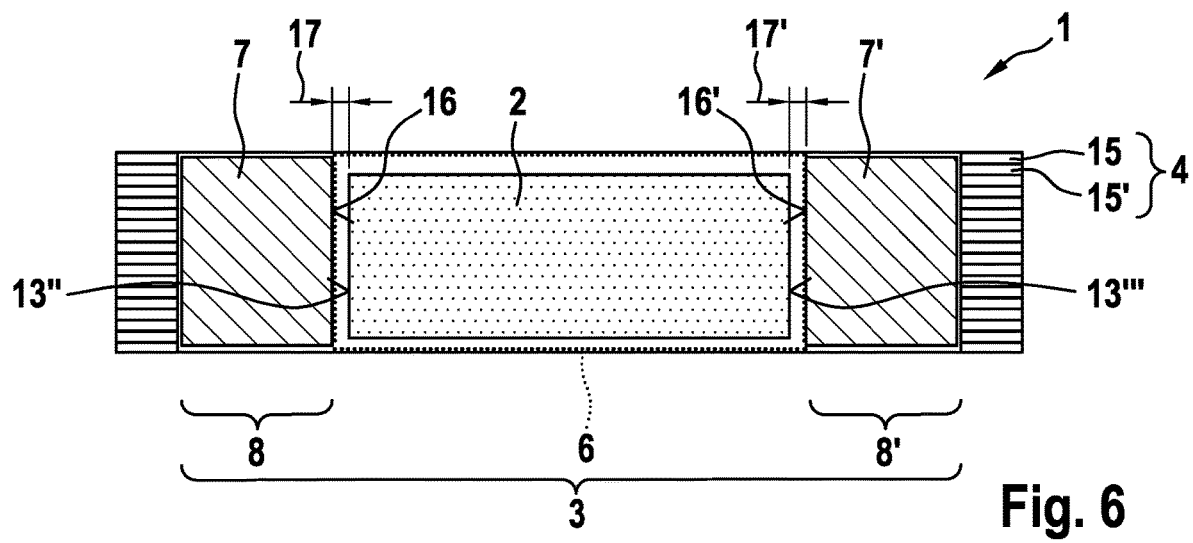
FIG. 6 shows a schematic diagram of a longitudinal section through a recess of a carrier body according to longitudinal section VI-VI from FIG. 3.

According to the embodiment shown in FIG. 5, it may be provided that at least one cavity 10, 10' is formed within at least one filler means 7, 7'. This at least one cavity 10, 10' can be present during the injection of the fixing material 5 and/or at least in the final production state of the component 1. For example, a filler means 7, 7' provided with a cavity 10, 10' is already introduced into the recess 3 and then remains in the component 1 as part thereof. Alternatively or additionally, after the fixing material 5 has cured, at least part of the filler means 7, 7' can be removed so that a corresponding cavity 10, 10' remains or is formed on or in the filler means 7, 7' remaining in the component 1.

As indicated in FIG. 1, the carrier body 4 can have multiple recesses 3, in each of which at least one structural element 2 is arranged. Preferably, in a first step, a group of structural elements 2, in particular all structural elements 2 of a component 1, is/are arranged in the recesses 3 and, in a subsequent step, the fixing material 5 is injected to fix the group of structural elements 2, in particular all structural elements 2 of a component 1, within the recesses 3.

In this case, it can be provided that a first group of structural elements 2, in particular at least partially arranged in different recesses 3, are fixed in a first step by injecting a fixing material 5 and, in a subsequent step, a second group of structural elements 2, in particular arranged at least in different recesses 3, are fixed by injecting a fixing material 5.

The structural element 2 can be arranged and/or formed within the at least one recess 3 of the carrier body 4 in such a way that the structural element 2 is at a distance 12 from at least one boundary surface 14 of the carrier body 4 defining the recess 3, in particular the structural element 2 is arranged or formed in such a way that it is at a distance 12, 12' from all boundary surfaces 14, 14' of the carrier body 4 defining the recess 3. The distance 12, 12' of the spacing volume is located between the surfaces 13, 13' or boundary surfaces of the structural element 2 and the boundary surfaces 14, 14' of the carrier body 4 forming the recess. Thus, the distance 12, 12' indicates the distance between the structural element 2 and the walls of the carrier body 4 forming the recess 3. Additionally or alternatively, the structural element 2 can be formed or arranged within the recess 3 in such a way that further surfaces 13", 13''' of the structural element 2 have a distance 17, 17' from filler means 7, 7' inserted in the second recess portions 8, 8' or from the surfaces 16, 16' of the filler means 7, 7' facing the structural element 2.

Figure 4:
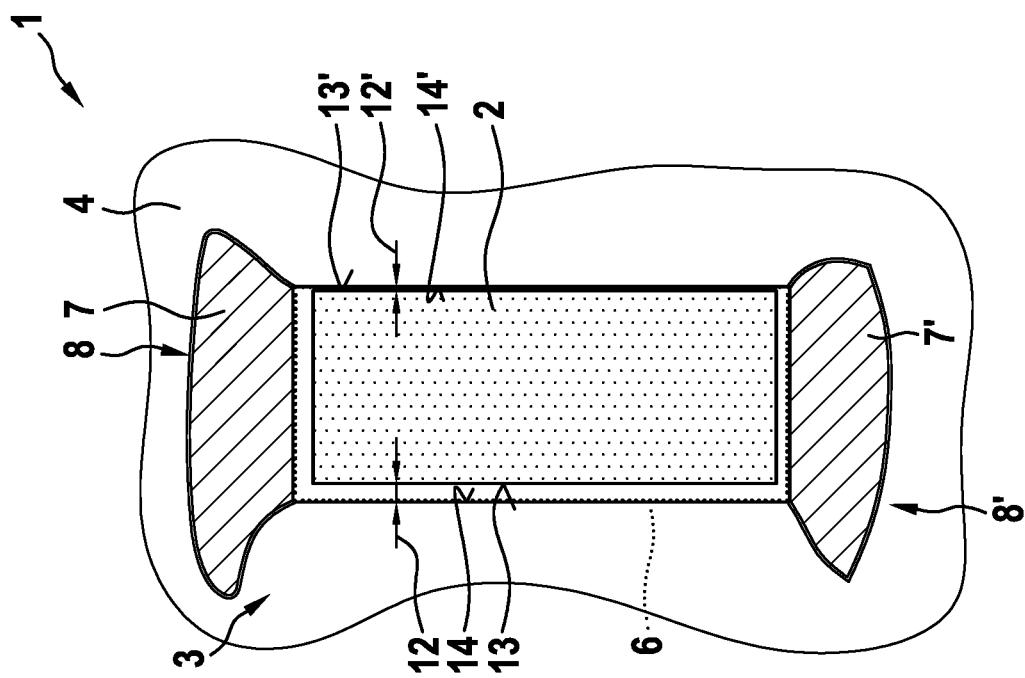
FIG. 4 shows a schematic plan view of a recess arranged in a carrier body in accordance with an exemplary embodiment.
Figure 3:
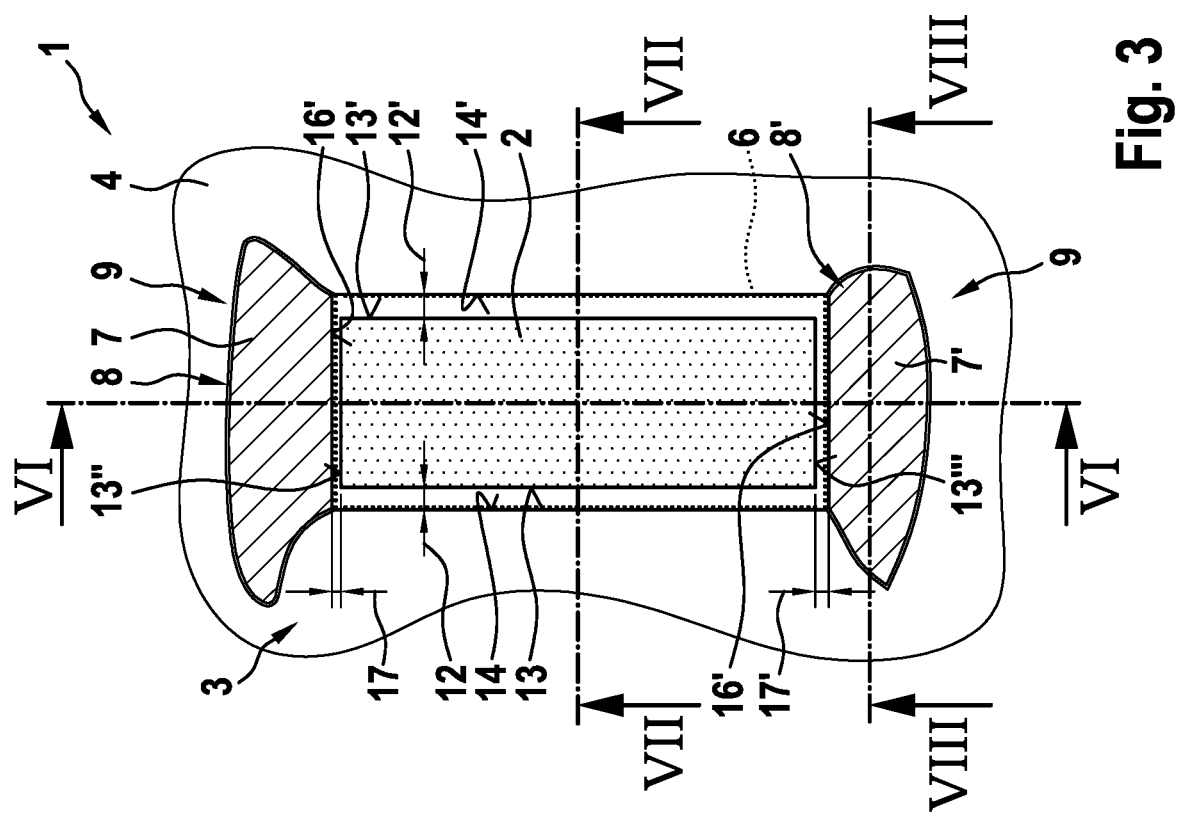
FIG. 3 shows a schematic plan view of a recess arranged in a carrier body in accordance with an exemplary embodiment.

As can be seen in FIGS. 3 to 5, the distances 12, 12', 17, 17' of the structural element 2 from the boundary surfaces 14, 14' of the recess 3 of the carrier body 4 directly facing the structural element 2 as well as the surfaces 16, 16' of the filler means 7, 7' can form a spacing volume of the structural element 2 not yet fixed with fixing material 5. This spacing volume forms the free space for receiving the fixing material 5 and thus for fixing the structural element 2 in the carrier element. 4. The spacing volume can completely surround the structural element 2, wherein only holding regions 18 may form an interruption of the complete surrounding or the complete enclosure. Such holding regions 18 may serve to fix the placement and/or position of the structural element 2 during the injection moulding step for introducing the fixing material 5.

Figure 7:
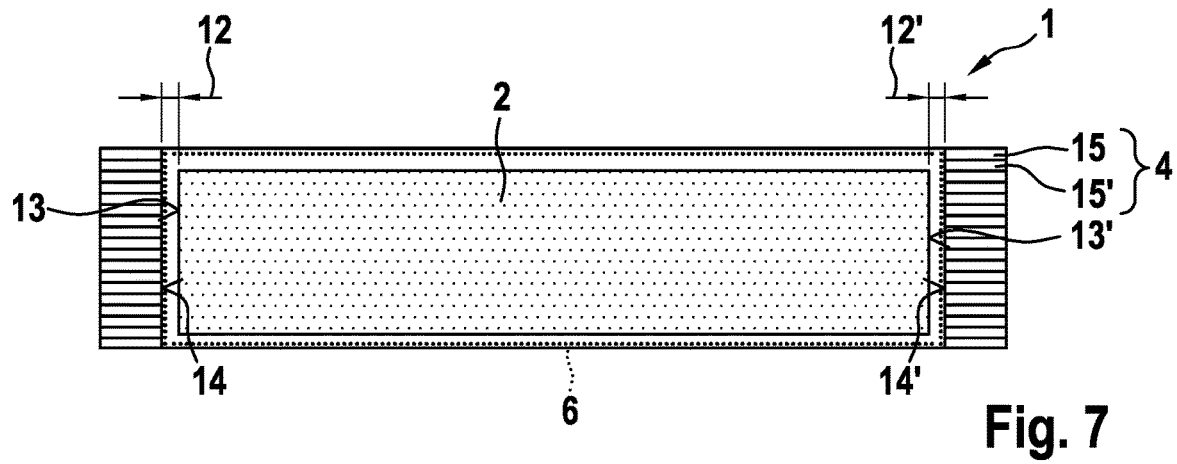
FIG. 7 shows a schematic diagram of a cross-section through a recess of a carrier body according to cross-section VII-VII of FIG. 3.
Figure 8:
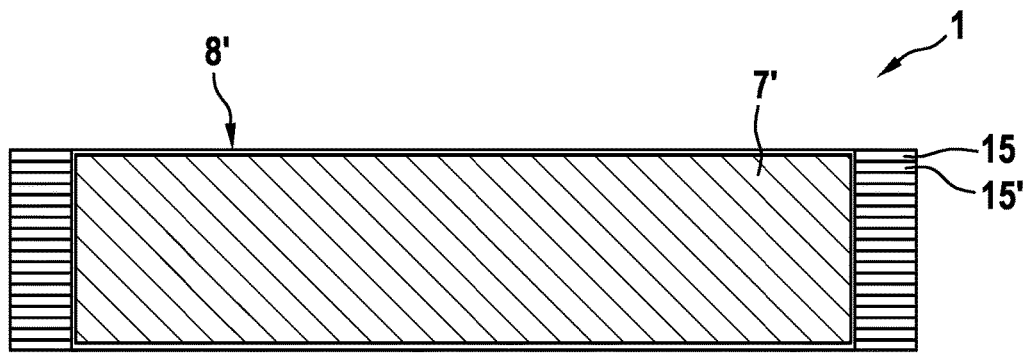
FIG. 8 shows a schematic cross-sectional depiction of a cross-section through a recess of a carrier body according to cross-section VIII-VIII from FIG. 3.

The spacing volume, in particular the first recess portion 6, can be filled with fixing material 5 at least partially, in particular completely, during the injection of the fixing material 5, so that the first recess portion 6 can be completely filled, for example, with the structural element 2 and the fixing material 5, with the exception of any holding regions 18. Here, the fixing material 5 can surround or enclose the structural element 2 predominantly or completely, see FIGS. 7 and 8.

The at least one structural element 2 can have a first and a second surface 13, 13', 13", 13''' and can be arranged in the recess 3 in such a way that the first surface 13 is assigned to a first boundary surface 14 of the recess 3, in particular oriented parallel to the first surface 13, and the second surface 13' is assigned to a second boundary surface 14' of the recess 3, in particular oriented parallel to the second surface 13', wherein the first surface 13 is at a first distance 12 from the first boundary surface 14 and the second surface 13' is at a second distance 12' from the second boundary surface 14', and in particular the first distance 12 corresponds to 0.25 to 4 times, preferably 0.5 to 2 times, particularly preferably 0.75 to 1.34 times the second distance 12'.

According to the embodiment shown in FIG. 4, it can be provided that the surface 12' of the structural element 2 has no distance 12' from at least one or a single boundary surface 14' of the recess 3, or lies against this boundary surface 14', in particular surface-to-surface.

A plastic can be used as fixing material 5, preferably a thermoplastic is used as fixing material 5, and particularly preferably a polyester, in particular a polyethylene terephthalate (PET), and/or a polyamide, in particular a tetramethylene diamine (PA4.6) or nylon (PA6.6), and/or a polyphthalamide (PPA) and/or a polypropylene (PP) and/or polyphenylene sulphide (PPS) and/or a polyetheretherketone (PEEK) and/or a liquid crystalline polymer (LCP) LCP is used as fixing material 5.

The carrier body 4 can be compressed before the fixing material 5 is injected, in particular before the at least one structural element 2 is arranged in the recess 3 of the carrier body 4; preferably, the fixing material 5 is injected into the recess 3, in particular into the second recess portion 8, in the compressed state of the carrier body 4.

The compression of the carrier body 4 is particularly advantageous if the carrier body 4 is constructed from multiple parts. For example, the carrier body 4 is formed from at least two, in particular a plurality of, disc-like or disc-shaped carrier body plates 15, 15', see FIGS. 6 to 8. These at least two carrier body plates 15, 15' can be assembled to form a carrier body plate stack before the fixing material 5 is injected into the recess 3. In other words, a plurality of carrier body plates 15, 15' are assembled or stacked to form the carrier body 4 in the stacked state. Due to this built or assembled structure of the carrier body 4, the latter may have gaps at the contact regions of the carrier body plates 15, 15', which gaps are preferably closed at least partially, in particular completely, by compressing the carrier body 4 before the injection of the fixing material 5, so that during the injection of the fixing material 5 no fixing material 5, in particular not even pressurised fixing material 5, can pass into these gaps and/or via the gaps to the outside or to the outer edge region of the carrier body 4.

For injecting the fixing material 5 into the at least one recess 3 of the carrier body 4, a sprue distributor (not shown) can be applied to the carrier body 4 and has at least two sprue locations (not shown) for introducing the fixing material 5 into a recess 3; in particular, the fixing material 5 is injected into each recess 3 of the carrier body 4 provided with a structural element 2 by a sprue distributor which has at least two sprue locations for each recess 3.

In order to carry out the method, a device for carrying out the method described herein for producing a component 1 provided with at least one structural element 2 can be provided. This device may comprise, for example, a sprue distributor mentioned above and/or a compression unit (not shown) for at least temporarily compressing a component 1, in particular a component 1 having a multi-part structure.

The component 1 produced in the method described herein can form part of an electrical machine, in particular part of a rotor or a stator.

LIST OF REFERENCE SIGNS

1 component
2 structural element
3 recess
4 carrier body
5 fixing material
6 first recess portion
7, 7' filler means
8, 8' second recess portion
9 problematic geometric region
10, 10' cavity
12 12' distance between 2 and 14
13, 13', 13", 13'" surface of 2
14 14' boundary surface of 4
15, 15' carrier body plates
16, 16' surface of 7, 7'
17, 17' distance between 2 and 7, 7'
18 holding region

The invention claimed is:

1. A method for producing a component provided with at least one structural element, in particular with a functional element, in particular a component for an electrical machine, wherein the at least one structural element is fixed in a recess of a carrier body by a fixing material introduced in an injection moulding process, the method comprising:
providing a carrier body provided with at least one recess, arranging the at least one structural element at least partially, in particular completely, within a first recess portion arranged in the recess of the carrier body,
arranging at least one filler means in a second recess portion of the recess of the carrier body,
injecting a fixing material, in particular consisting of plastic, into the first recess portion of the recess of the carrier body in the course of an injection moulding process, wherein the fixing material fixes the at least one structural element within the recess, wherein the carrier body is compressed before the fixing material is injected and the fixing material is injected into the recess portion in the compressed state of the carrier body.

2. The method according to claim 1, wherein at least one structural element is used which is formed as a functional element performing at least one function, in particular the structural element is formed at least partially as a magnet and/or as a sensor and/or as an actuator and/or as a heat dissipation means.

3. The method according to claim 1, wherein the fixing material comes into contact with the at least one structural element and the at least one filler means at least during the injection of the fixing material into the first recess portion of the recess of the carrier body.

4. The method according to claim 1, wherein a filler means is used which is formed at least partially, in particular completely, from a thermoplastic and/or a thermoset and/or which is formed at least partially, in particular completely, from a metal.

5. The method according to claim 1, wherein the filler means remains at least partially, in particular completely, in the recess after the injection of the fixing material, in particular the filler means forms at least partially, in particular completely, a part of the component provided with at least one structural element.

6. The method according to claim 1, wherein the filler means is removed from the recess at least partially, in particular completely, after injection of the fixing material, in particular after curing of the fixing material.

7. The method according to claim 1, wherein, prior to injection of the fixing material, a first and at least one further filler means are arranged within a recess, in particular the fixing material touches the first and the at least one further filler means during the injection of the structural element.

8. The method according to claim 1, wherein the carrier body has at least two, in particular more than ten, recesses, in each of which at least one structural element is arranged, in particular all structural elements of a component, is/are arranged in the recesses and in a subsequent step the fixing material is injected to fix the group of structural elements, in particular all the structural elements of a component, within the recesses.

9. The method according to claim 1, wherein a first group of structural elements, in particular at least partially arranged in different recesses, are fixed in a first step by injection of a fixing material, and in a subsequent step a second group of structural elements, in particular arranged at least in different recesses, are fixed by injection of a fixing material.

10. The method according to claim 1, wherein the structural element is arranged within the at least one recess of the carrier body in such a way that the structural element is at a distance from at least one boundary surface of the carrier body defining the recess, which distance defines a spacing volume, in particular the structural element is arranged or formed in such a way that it is at a distance from all the boundary surfaces of the carrier body defining the recess, which distance defines a spacing volume.

11. The method according to claim 10, wherein the spacing volume, in particular the first recess portion, is filled at least partially, in particular completely, with fixing material during the injection of the fixing material.

12. The method according to claim 1, wherein the at least one structural element has a first surface and at least one further surface and is arranged in the recess in such a way that the first surface is assigned to a first boundary surface of the recess, in particular oriented parallel to the first surface, and the second surface is assigned to a second boundary surface of the recess, in particular oriented parallel to the at least one further surface, wherein the first surface is at a first distance from the first boundary surface and the at least one further surface is at a second distance from the second boundary surface, and in particular the first distance corresponds to 0.25 to 4 times the second distance.

13. The method according to claim 1, wherein a plastic is used as fixing material, in particular a polyethylene terephthalate (PET), and/or a polyamide, in particular a tetramethylene diamine (PA4.6) or nylon (PA6.6), and/or a polyphthalamide (PPA) and/or a polypropylene (PP) and/or polyphenylene sulphide (PPS) and/or a polyetheretherketone (PEEK) and/or a liquid crystalline polymer (LCP) is used as fixing material.

14. The method according to claim 1, wherein the carrier body is compressed before the at least one structural element is arranged in the recess of the carrier body.

15. The method according to claim 1, wherein a filler means and/or a fixing material is used which has a stiffness which corresponds to the stiffness of the carrier body by a factor of 0.5 to 1.5.

16. The method according to claim 1, wherein the carrier body together with at least one filler means arranged in a recess of the carrier body are compressed, in particular before or during an introduction of a fixing material into the recess, wherein the carrier body and the at least one filler means have a similar or identical stiffness and/or spring behaviour.

17. The method according to claim 1, wherein a carrier body is used which is constructed from at least two, in particular at least ten, disc-like or disc-shaped carrier body plates the carrier body plates (15, 15') are assembled before the fixing material (5) is injected into the recess (3).

18. The method according to claim 1, wherein, for injecting the fixing material into the at least one recess of the carrier body, a sprue distributor is applied to the carrier body and has at least two sprue locations for introducing the fixing material into a recess, and in particular the fixing material is injected into each recess, provided with a structural element, of the carrier body by a sprue distributor which has at least two sprue locations for each recess.

19. A device for carrying out a method for producing a component provided with at least one structural element according to claim 1.

20. A component, in particular component for an electrical machine, produced in a method according to claim 1.

\* \* \* \* \*